United States Patent
Wang et al.

(10) Patent No.: US 9,860,936 B2
(45) Date of Patent: Jan. 2, 2018

(54) METHODS, APPARATUSES, AND SYSTEM FOR DETERMINING CONNECTION STATE ASSISTIVE PARAMETERS

(71) Applicant: ALCATEL LUCENT, Boulogne, Billancourt (FR)

(72) Inventors: Yonggang Wang, Shanghai (CN); Hua Chao, Shanghai (CN); Nicola Puddle, Swindon (GB); Sudeep Palat, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 66 days.

(21) Appl. No.: 14/910,743

(22) PCT Filed: Aug. 8, 2014

(86) PCT No.: PCT/IB2014/002008
§ 371 (c)(1),
(2) Date: Feb. 8, 2016

(87) PCT Pub. No.: WO2015/019180
PCT Pub. Date: Feb. 12, 2015

(65) Prior Publication Data
US 2016/0198519 A1    Jul. 7, 2016

(30) Foreign Application Priority Data
Aug. 9, 2013    (CN) ........................ 2013 1 0347805

(51) Int. Cl.
*H04W 76/04* (2009.01)
*H04W 76/06* (2009.01)
*H04W 36/26* (2009.01)

(52) U.S. Cl.
CPC ......... *H04W 76/046* (2013.01); *H04W 36/26* (2013.01); *H04W 76/048* (2013.01); *H04W 76/068* (2013.01)

(58) Field of Classification Search
CPC . H04W 72/048; H04W 72/046; H04W 72/68; H04W 36/26
See application file for complete search history.

(56) References Cited

U.S. PATENT DOCUMENTS

| 2002/0172178 A1 | 11/2002 | Suzuki et al. |
| 2007/0211675 A1* | 9/2007 | Jain ........................ H04W 88/06 370/338 |

(Continued)

FOREIGN PATENT DOCUMENTS

| CN | 101039208 | 9/2007 |
| CN | 102123447 | 7/2011 |

(Continued)

OTHER PUBLICATIONS

International Search Report for PCT/IB2014/002008 dated Jun. 8, 2015.

(Continued)

*Primary Examiner* — Jianye Wu
(74) *Attorney, Agent, or Firm* — Fay Sharpe, LLP

(57) ABSTRACT

An object of the invention is providing methods, apparatuses and a system for determining connection state assistive parameters. Compared with the prior art, according to the present invention, the core network element obtains the connection release time information and radio access network assistance information corresponding to the user equipment sent by the e NB, and when the user equipment transmits a request for network access service to the core network element, the core network element determines core network assistance information corresponding to the request for network access service based on the aforementioned information, and then transmits the core network assistance information to the e NB to act as connection state assistive parameters corresponding to the user equipment. Thereby, the present invention may enable the e NB to adjust/optimize the connection state assistive parameters corresponding to the e NB and the user equipment through providing ore network assistance information to the e NB by the core network element, reduce the transitions frequency between the idle state and the connection state, minimize (Continued)

transmission of network signaling, and reduce user equipment power consumption.

12 Claims, 6 Drawing Sheets

(56) References Cited

U.S. PATENT DOCUMENTS

| | | | |
|---|---|---|---|
| 2007/0259673 A1 | 11/2007 | Willars | |
| 2012/0120815 A1 | 5/2012 | Anderson et al. | |
| 2013/0130693 A1 | 5/2013 | Salvador et al. | |
| 2015/0282145 A1* | 10/2015 | Kim | H04W 76/048 |
| | | | 455/450 |

FOREIGN PATENT DOCUMENTS

| | | |
|---|---|---|
| KR | 10-0924953 | 10/2009 |
| WO | WO 2012/153211 A1 | 11/2012 |
| WO | 2013/062388 | 5/2013 |

OTHER PUBLICATIONS

R2131997; 3GPP TSG-RAN WG RAN2#82, Fukuoka, Japan, "RAN impacts of long connected mode for SDDTE", May 20-24, 2013.

S2132671; SA WG2 Meeting S2#98, Valencia, Spain, "Extended DRX: Selection between idle and connected DRX", Jul. 15-19, 2013.

* cited by examiner

METHODS, APPARATUSES, AND SYSTEM FOR DETERMINING CONNECTION STATE ASSISTIVE PARAMETERS

FIELD OF THE INVENTION

The present invention relates to the field of communication, and in particular to the technology of determining connection state assistive parameters.

BACKGROUND OF THE INVENTION

In order to minimize UE (user equipment) state transitions between a connection state and an idle state, it is needed to define one or more methods to keep the UE in a connection state while reducing signaling overheads in the connection state through for example modifying the value of the parameters for measurement reporting and handover behavior, and reducing power consumption through for example adjusting DRX (Discontinuous Reception) cycle.

In order to achieve the above method(s), the eNB (evolved Node B) may employ user inactivity timer to a very longer value. The purpose is to reduce the signaling overhead of frequent RRC (Radio Resource Control) connection establishments. The main benefits of the method are: it doesn't have specification change to the protocol, and greatly reduces the signaling overhead.

However, this method has many problems:

First, keeping the UE in the connection state will consume considerable amount of UE power because UE will send small amounts of data often, for example, maintenance of UE timing advance, periodic channel sounding, and measurement reports.

Second, whether the control channel is sufficient to support a large number of UEs with small data transmissions. The long connected may cause the control channel very inefficient due to the very long packet inter-arrival time.

Third, for fast moving UEs, the HO signaling would increase and even exceed the signaling of RRC connection establishment.

Although the above problems may be solved by adjusting the DRX parameter, adjusting the inactivity time, and evaluating the "mobility state" specific to each UE, and other manners, all of the above methods need appropriate configurations; otherwise, many UEs in the connection state will waste network resources, waste handover-related signaling, and UE power.

SUMMARY OF THE INVENTION

An object of the invention is providing methods, apparatuses and a system for determining connection state assistive parameters.

According to one aspect of the invention, a method for determining connection state assistive parameters in an eNB is provided, wherein the method comprises the following steps:

a. transmitting connection release time information and radio access network assistance information corresponding to a user equipment to a corresponding core network element;

wherein, the method further comprises:

b. transmitting a request for network access service of the user equipment to the core network element;

c. obtaining core network assistance information provided by the core network element, wherein, the core network assistance information corresponds to the request for network access service;

d. determining connection state assistive parameters corresponding to the user equipment based on the core network assistance information;

wherein the core network assistance information includes at least any one of the following:

discontinuous reception parameter corresponding to the user equipment;

short inactivity timer information corresponding to the user equipment;

long inactivity timer information corresponding to the user equipment.

According to another aspect of the invention, a method for determining connection state assistive parameters subsidiarily in a core network element is further provided, wherein the method comprises the following steps:

A. obtaining connection release time information and radio access network assistance information corresponding to the user equipment;

wherein the method further comprises:

B. obtaining a request for network access service corresponding to the user equipment;

C. determining core network assistance information corresponding to the request for network access service based on the connection release time information and the radio access network assistance information;

D. transmitting the core network assistance information to an eNB corresponding to the request for network access service, to act as connection state assistive parameters corresponding to the user equipment;

wherein the core network assistance information includes at least any one of the following:

discontinuous reception parameter corresponding to the user equipment;

short inactivity timer information corresponding to the user equipment;

long inactivity timer information corresponding to the user equipment.

According to another aspect of the invention, an eNB for determining connection state assistive parameters is further provided, wherein the eNB comprises:

a first assistive transmitting module configured to transmit connection release time information and radio access network assistance information corresponding to a user equipment to a corresponding core network element;

wherein the eNB further comprises:

a request transmitting module configured to transmit a request for network access service of the user equipment to the core network element;

a second assistive obtaining module configured to obtain core network assistance information provided by the core network element, wherein, the core network assistance information corresponds to the request for network access service;

a second assistive determining module configured to determine connection state assistive parameters corresponding to the user equipment based on the core network assistance information;

wherein the core network assistance information includes at least any one of the following:

discontinuous reception parameter corresponding to the user equipment;

short inactivity timer information corresponding to the user equipment;

long inactivity timer information corresponding to the user equipment.

According to another aspect of the invention, a core network element for determining connection state assistive parameters subsidiarily is further provided, wherein the device comprises:

a first assistive obtaining module configured to obtain connection release time information and radio access network assistance information corresponding to the user equipment;

wherein the device further comprises:

a request obtaining module configured to obtain a request for network access service corresponding to the user equipment;

a second assistive determining module configured to determine core network assistance information corresponding to the request for network access service based on the connection release time information and the radio access network assistance information;

a second assistive transmitting module configured to transmit the core network assistance information to an eNB corresponding to the request for network access service, to act as connection state assistive parameters corresponding to the user equipment;

wherein the core network assistance information includes at least any one of the following:

discontinuous reception parameter corresponding to the user equipment;

short inactivity timer information corresponding to the user equipment;

long inactivity timer information corresponding to the user equipment.

According to another aspect of the invention, a system for determining connection state assistive parameters is further provided, comprising the eNB as aforesaid, and the core network element as aforesaid.

Compared with the prior art, according to the present invention, the core network element obtains the connection release time information and radio access network assistance information corresponding to the user equipment sent by the eNB, and when the user equipment transmits a request for network access service to the core network element, the core network element determines core network assistance information corresponding to the request for network access service based on the connection release time information and the radio access network assistance information, and then transmits the core network assistance information to the eNB to act as connection state assistive parameters corresponding to the user equipment. Thereby, the present invention may enable the eNB to adjust/optimize the connection state assistive parameters corresponding to the eNB and the user equipment through providing ore network assistance information to the eNB by the core network element, reduce the transitions frequency between the idle state and the connection state, minimize transmission of network signaling, and reduce user equipment power consumption.

Moreover, the present invention may further obtain the mobility state report of the user equipment by the eNB, and adjust connection state assistive parameters in the eNB corresponding to the user equipment based on the mobility state report in conjunction with the core network element assistance information, and further update the radio access network assistance information corresponding to the user equipment based on the connection state assistive parameters. Thereby, the present invention may update the radio access network assistance information based on the latest mobility state report of the user equipment, and enhances the adaptability of the radio access network assistance information with the user equipment.

Moreover, when the core network assistance information includes the short inactivity timer information and the long inactivity timer information corresponding to the user equipment, the present invention may also determine a scheduling policy corresponding to the user equipment based on the short inactivity timer information and the long inactivity timer information in conjunction with data information transmission state of the eNB and the user equipment. Thereby, the present invention may decide, based on the short inactivity timer information, between transiting and releasing the user equipment, which reduces transitions frequency between an idle state and a connection state, minimizes network signaling, and reduces the user equipment power consumption.

Moreover, the present invention may also obtain activity dynamic monitoring information of the user equipment, and determines core network assistance information corresponding to the user equipment based on the connection release time information and the radio access network assistance information in conjunction with the activity dynamic monitoring information, thereby enhancing the adaptability of the core network assistance information with the user equipment.

BRIEF DESCRIPTION OF THE DRAWINGS

Other features, purposes and advantages of the invention will become more explicit by means of reading the detailed statement of the non-restrictive embodiments made with reference to the accompanying drawings.

Figure 1:
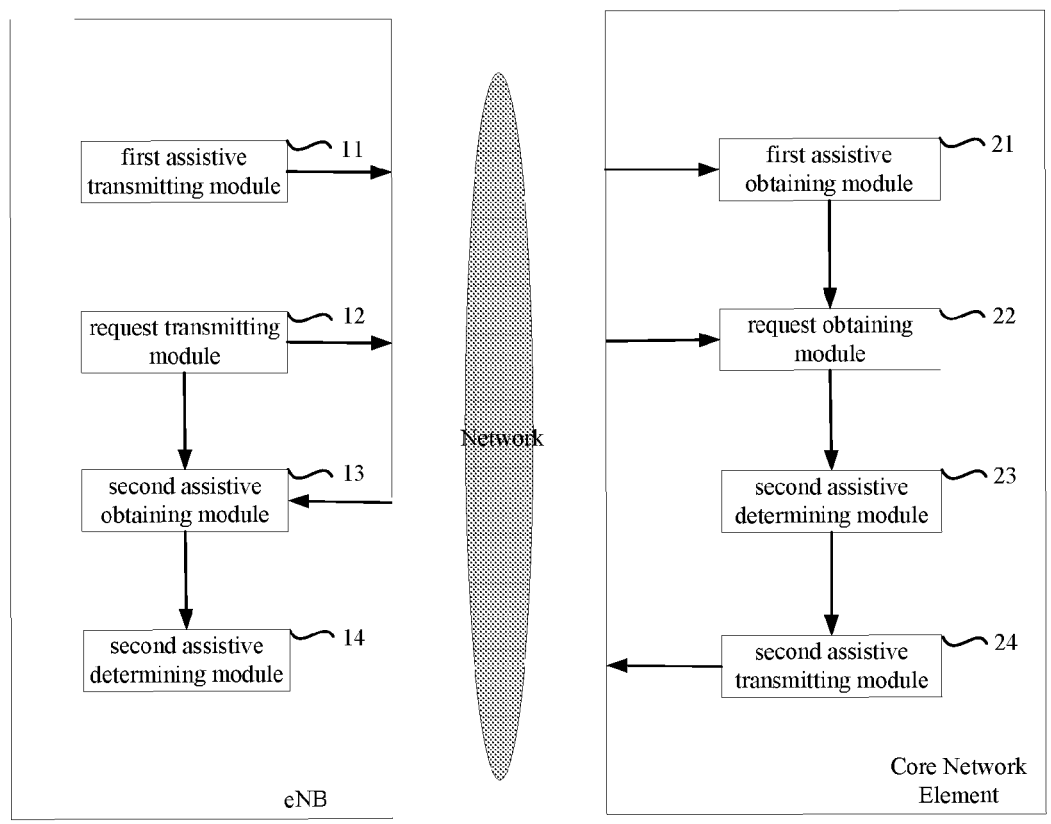
FIG. 1 shows a schematic diagram of an eNB and a core network element device for determining connection state assistive parameters according to one aspect of the present invention.

The same or similar reference signs in the drawings represent the same or similar component parts.

DETAILED DESCRIPTION OF THE INVENTION

Below, details of the invention will be further provided in combination with the accompanying drawings.

FIG. 1 shows a schematic diagram of an eNB and a core network element device for determining connection state assistive parameters according to one aspect of the present invention, wherein the eNB comprises a first assistive transmitting module 11, a request transmitting module 12, a second assistive obtaining module 13, a second assistive determining module 14, and the core network element comprises a first assistive obtaining module 21, a request obtaining module 22, a second assistive determining module 23, and a second assistive transmitting module 24.

Specifically, the first assistive transmitting module 11 of the eNB transmits connection release time information and radio access network assistance information corresponding to a user equipment to a corresponding core network element; correspondingly, the first assistive obtaining module 21 of the core network element obtains the connection release time information and the radio access network assistance information corresponding to the user equipment; the request transmitting module 12 of the eNB transmits a request for network access service of the user equipment to the core network element; correspondingly, the request obtaining module 22 of the core network element obtains the request for network access service corresponding to the user equipment; the second assistive determining module 23 determines core network assistance information corresponding to the request for network access service based on the connection release time information and the radio access network assistance information; the second assistive transmitting module 24 transmits the core network assistance information to the eNB corresponding to the request for network access service, to act as connection state assistive parameters corresponding to the user equipment; correspondingly, the second assistive obtaining module 13 of the eNB obtains the core network assistance information provided by the core network element, wherein, the core network assistance information corresponds to the request for network access service; the second assistive determining module 14 determines connection state assistive parameters corresponding to the user equipment based on the core network assistance information.

Herein, the eNB is in a RAN (Radio Access Network), while the core network element is in a CN (Core Network); here, the core network element comprises one or more MMEs (Mobility Management Entity) or one or more SGSNs (Serving GPRS SUPPORT NODE).

The first assistive transmitting module 11 of the eNB transmits connection release time information and radio access network assistance information corresponding to a user equipment to a corresponding core network element; correspondingly, the first assistive obtaining module 21 of the core network element obtains the connection release time information and the radio access network assistance information corresponding to the user equipment.

Specifically, the first assistive transmitting module 11 of the eNB transmits, in RAN, the connection release time information and radio access network assistance information corresponding to the user equipment, by using, e.g., the S1-AP protocol.

In this embodiment, the connection release time information includes relevant time information of the user equipment during the connection process, e.g., the connection establishment time, the release requesting time, the release completing time, and among others.

The radio access network assistance information (RAN assistance information) comprises at least any one of the following:
  discontinuous reception parameter corresponding to the user equipment;
  short inactivity timer information corresponding to the user equipment;
  long inactivity timer information corresponding to the user equipment;
  statistics of packet inter-arrival time of the user equipment;
  current count of the inactivity timer of the user equipment.

Preferably, the eNB may transmit a RRC connection release request to the user equipment, and transmit a context release request corresponding to the user equipment to the core network element; the core network element transmits a context release command corresponding to the user equipment to the eNB based on the context release request corresponding to the user equipment; the eNB releases the connection to the user equipment based on the context release command, and transmits context release command completion information of the user equipment to the core network element.

In this embodiment, the context release command completion information includes connection release time information and radio access network assistance information corresponding to the user equipment.

Namely, in the eNB, the eNB:
  transmits a RRC connection release request to the user equipment and transmits a context release request of the user equipment to a corresponding core network element;
  obtains a context release command of the user equipment corresponding to the context release request, wherein, the context release command is transmitted by the core network element;
  transmits the context release command completion information of the user equipment corresponding to the context release command of the user equipment to the core network element based on the context release command of the user equipment, wherein the context release command completion information of the user equipment includes the connection release time information and the radio access network assistance information corresponding to the user equipment.

In the core network element, the core network element:
  obtains the context release request of the user equipment;
  transmits the context release command of the user equipment corresponding to the context release request of the user equipment to the eNB corresponding to the context release request;
  obtains the context release command completion information of the user equipment corresponding to the context release command of the user equipment, wherein the context release command completion information of the user equipment is provided by the eNB and includes the connection release time information and the radio access network assistance information corresponding to the user equipment.

Namely, when the user equipment releases the connection with the eNB, the eNB will transmit the connection release time information and radio access network assistance information corresponding to the user equipment to the core network element.

More preferably, the eNB may transmit a RRC connection release request to the user equipment based on a predetermined release condition, wherein the predetermined release condition includes any least any one of the following:
  the longer inactivity timer corresponding to the user equipment expires;
  performing correction release to the user equipment in the case that the short inactivity timer corresponding to the user equipment expires and there is no data information forwarded currently.

The request transmitting module 12 of the eNB transmits a request for network access service of the user equipment to the core network element; correspondingly, the request obtaining module 22 of the core network element obtains the request for network access service corresponding to the user equipment.

Specifically, the request transmitting module 12 of the eNB obtains a request for network access service of the user equipment, wherein the request for network access service may be transmitted by the user equipment to the request transmitting module 12; for example, when the user equipment obtains new small data for transmission, the user equipment transmits the request for network access service to the request transmitting module 12 of the eNB; then, the request transmitting module 12 of the eNB transmits the request for network access service of the user equipment to the core network element using a NAS protocol.

Correspondingly, the request obtaining module 22 obtains the request for network access service corresponding to the user equipment through interaction with the eNB using the NAS protocol.

Here, the user equipment and the user equipment corresponding to the connection release time information and radio access network assistance information in the first assistive transmitting module 11 and/or the first assistive obtaining module 21 are the same equipment; the core network element records, in the first assistive obtaining module 21, user equipment ID information of the user equipment corresponding to the connection release time information and radio access network assistance information. When the core network element obtains the request for network access service of the user equipment, the core network element authenticates the user equipment ID information of the user equipment corresponding to the request for network access service. If the core network element includes the connection release time information and the radio access network assistive information corresponding to the user equipment ID information, the step of the second assistive determining module 23 is performed in continuation.

Those skilled in the art should understand, here, the user equipment may transmit the request for network access service via one or more eNBs; namely, the user equipment may transmit the connection release time information and the radio access network assistive information corresponding to the user equipment to the corresponding core network element via the first assistive transmitting module 11 of the first eNB, and then the user equipment transmits the request for network access service of the user equipment to the core network element via the request transmitting module 12 of the first eNB or the second eNB.

The second assistive determining module 23 determines core network assistive information corresponding to the request for network access service based on the connection release time information and the radio access network assistive information.

Specifically, the second assistive determining module 23 of the core network element determines the core network assistance information based on the connection release time information and the radio access network assistance information through a plurality of time parameters in the connection release time information and various kinds of parameters in the radio access network assistance information; wherein the core network assistance information corresponds to the request for network service; since the request for network service includes the user equipment ID of the user equipment, the core network assistance information also corresponds to the user equipment.

Herein, the core network assistance information includes at least any one of the following:

discontinuous reception parameter (DRX parameter) corresponding to the user equipment;

short inactivity timer information corresponding to the user equipment;

longer inactivity timer information corresponding to the user equipment.

Preferably, the core network assistance information further includes:

packet inter-arrival time information corresponding to the user equipment.

Here, the above parameters are explained as follows:

1. Discontinuous reception parameter corresponding to the user equipment: the discontinuous reception parameter includes: DRX cycle and onDuration Timer.

In the connected mode, the DRXcycle of the user equipment is used for monitoring PDCCH discontinuously. The longer the value of the DRX cycle is, the more power consumption is saved, but the greater is the probability of missing information; the shorter is the value of the DRX cycle, the smaller is the probability of missing information, and meanwhile the lower is the efficiency. For different applications, due to different traffic models/features, the values of the DRX cycle are also different. Configuring a proper value for a SDDTE UE shall be carefully for the eNB.

In the MAC layer, the onDuration Timer specifies a number of consecutive PDCCH-subframe(s) at the beginning of the DRX cycle. Similar with the DRX cycle itself, the eNB can also configure an proper value for the SDDTE UE.

2. Short inactivity timer information and longer inactivity timer information corresponding to the user equipment:

Because signaling to initialize a new RRC connection establishment is not that much larger than the signaling in a handover procedure, if there is more than one handover procedure before the inactivity timer expires, the more the signaling overhead would be.

Therefore, there are provided two inactivity timers, i.e., a short inactivity timer and a longer inactivity timer, both of which are proposed as the assistance information for assisting eNB in efficient decision making to keep UE in connected or idle mode. If the short inactivity timer expires the user equipment will be handed over to the idle mode at once eNB decides the UE to perform handover ahead of the Longer Inactivity Timer expiring.

When the handover will happen immediately and there is no data to be handed over, to keep the UE in connected mode is not valuable for the purpose of signaling saving. This scheme optimize the time of keeping UE in connected mode which does not require a prediction about the UE mobility.

3. Packet inter-arrival time information corresponding to the user equipment:

In the RAN, it could not conclude on a more precise maximum value for the packet inter-arrival time/UE inactivity cycle for which keeping UEs in connected mode is considered. Because at idle mode, any historical information about mobility would be unavailable at a new data access whether the UE is no mobility or in a new eNB, it may takes some time in eNB to find a more precise maximum value for the packet inter-arrival time/UE inactivity period.

The packet arrival distribution will impact the efficiency of the long connected mode. For example, to keeping the long connected is the most efficiency in the case of the high density packet arrival. But in other case, the low-density packet arrival will cause the long connection rather inefficiency. Furthermore, there may be a negative effect on radio resource usage e.g. PUCCH resources if many UEs are kept in connected mode but only active infrequently.

Therefore, by appointing each UE to keep in a connected state or an idle state, it is advantageous to reduce signaling load for frequency (small) data transmission. The data arrival time information can be defined and collected by the eNBs at the last connection time, and in the next connection, the core network element will forward the packet arrival time information to a new eNB. Therefore, the new eNB can take experiential decision for how long time to keep the UE in connected mode.

Preferably, the second assistive determining module 23 may obtain activity dynamic monitoring information of the user equipment and determine the core network assistance information corresponding to the user equipment based on the connection release time information and the radio access network assistance information in conjunction with the activity dynamic monitoring information.

Specifically, the second assistive determining module 23 interacts with the eNB to obtain or obtain in real-time the activity dynamic monitoring information of the user equipment, e.g., connection information, handover information, mobility information, state information, and the like, and determines the core network assistance information corresponding to the user equipment based on the connection release time information and radio access network assistance information in conjunction with the activity dynamic monitoring information.

The second assistive transmitting module 24 transmits the core network assistive information to the eNB corresponding to the request for network access service, to act as the connection state assistance parameters corresponding to the user equipment; correspondingly, the second assistive obtaining module 13 of the eNB obtains the core network assistance information provided by the core network element, which core network assistance information corresponds to the request for network access service.

Specifically, the second assistive transmitting module 24 directly transmits the core network assistive information to the eNB corresponding to the request for network access service, or transmits the core network assistance information in conjunction with information of an S1-AP initial context establishing request, to the eNB corresponding to the request for network access service, to act as the connection state assistance parameters corresponding to the user equipment.

Correspondingly, the second assistive obtaining module 13 of the eNB obtains the core network assistance information provided by the core network element, wherein, the core network assistance information corresponds to the request for network access service.

The second assistive determining module 14 determines connection state assistance parameters corresponding to the user equipment based on the core network assistance information.

Specifically, the second assistive determining module 14 of the eNB takes the core network assistance information as the connection state assistance parameters corresponding to the user equipment based on the core network assistance information, such that when the user equipment and the eNB are in a connected state, the eNB controls the connection state of the user equipment using the connection state assistance parameters corresponding to the user equipment.

Figure 2:
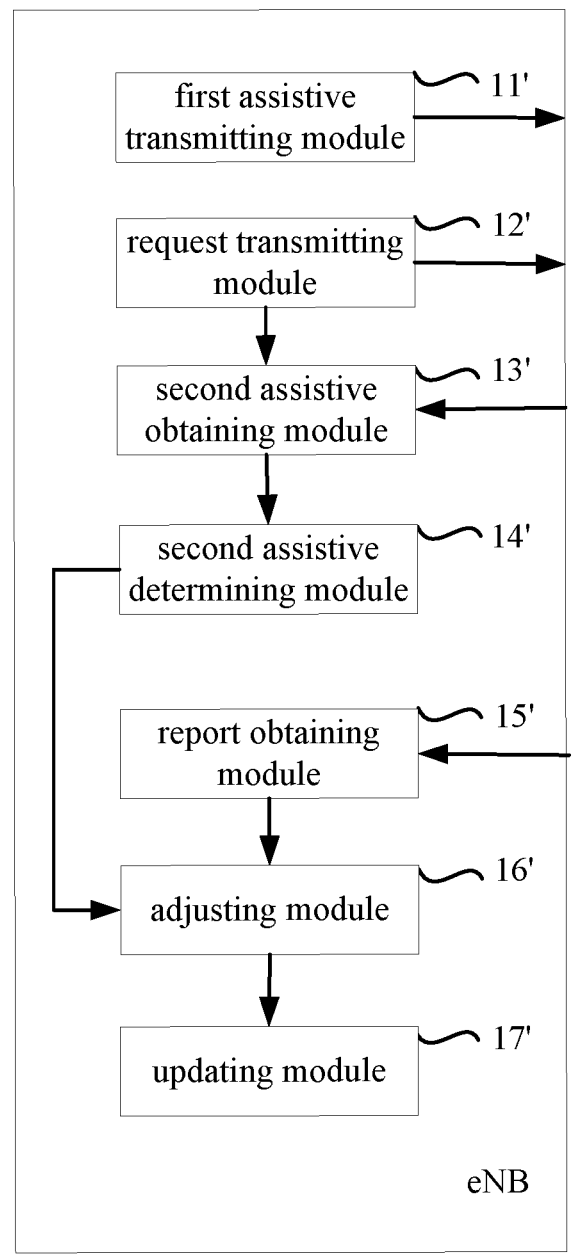
FIG. 2 shows a schematic diagram of an eNB for determining connection state assistance parameters according to one preferred embodiment of the present invention.

FIG. 2 shows a schematic diagram of an eNB for determining connection state assistance parameters according to one preferred embodiment of the present invention; specifically, the eNB comprises a first assistive transmitting module 11', a request transmitting module 12', a second assistive obtaining module 13', a second assistive determining module 14', a report obtaining module 15', an adjusting module 16', and an updating module 17'. Specifically, the first assistive transmitting module 11' transmits connection release time information and radio access network assistance information corresponding to the user equipment to a corresponding core network element; the request transmitting module 12' transmits a request for network access service of the user equipment to the core network element; the second assistive obtaining module 13' obtains the core network assistance information provided by the core network element, wherein, the core network assistance information corresponds to the request for network access service; the second assistive determining module 14' determines connection state assistance parameters corresponding to the user equipment based on the core network assistance information; the report obtaining module 15' obtains a mobility state report of the user equipment; the adjusting module 16' adjusts the connection state assistance parameters corresponding to the user equipment in the eNB based on the mobility state report in conjunction with the core network element assistance information; the updating module 17' updates the radio access network assistance information corresponding to the user equipment based on the connection state assistance parameter.

Herein, the first assistive transmitting module 11', the request transmitting module 12', the second assistive obtaining module 13', and the second assistive determining module 14' of the eNB are identical or substantially identical to corresponding modules shown in FIG. 1, which will not be detailed here, but incorporated here by reference.

The report obtaining module 15' obtains the mobility state report of the user equipment.

Specifically, the report obtaining module 15', through interaction with the user equipment, obtains the mobility state report of the user equipment; wherein the mobility state report includes, e.g., mobility state, handover times, transitions of cells, idle time and other information of the user equipment in idle/connection state.

Here, preferably, the eNB obtains the mobility state report of the user equipment only when the user equipment establishes a connection with the eNB; in this instance, the mobility state report includes, for example, mobility state, handover times, transitions of cells, idle time, and other information of the user equipment in idle state.

The reason is that the optimum trade-off between state transition and handover signaling depends on the cell sizes and UE movement. Therefore, for the decision about keeping UE in connected mode for a longer time would require a prediction about the UE mobility in order to be able to assess how much handover signaling can be expected.

According to Hetnet mobility WI, the user equipment should provide mobility information to the network at RRC connection setup. Therefore, it is not required to store the mobility state of the user from the latest connection; instead, the mobility state report of the user equipment is obtained when the user equipment performs establishment of RRC connection.

The adjusting module 16' adjusts connection state assistance parameters corresponding to the user equipment in the eNB based on the mobility state report in conjunction with the core network element assistance information, e.g., adjusting the inactivity timer information and/or DRX parameter of the user, and the like.

The updating module 17' updates the radio access network assistance information corresponding to the user equipment based on the connection state assistance parameters.

Here, the update may be an instant update; besides, because the eNB needs to transmit the radio access network assistance information to the core network element for storage when the user equipment and the eNB perform connection release, the radio access network assistance information corresponding to the user equipment may also be updated further based on the connection state assistance parameters when the user equipment and the eNB perform connection release, and meanwhile the updated radio access network assistance information is transmitted to the core network element.

Figure 3:
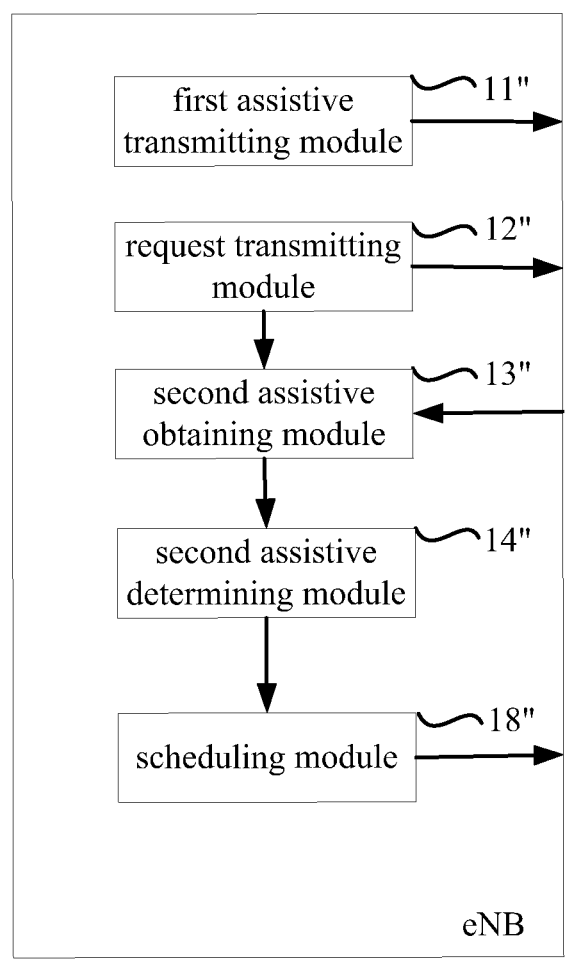
FIG. 3 shows a schematic diagram of an eNB for determining connection state assistance parameters according to another preferred embodiment of the present invention.

FIG. 3 shows a schematic diagram of an eNB for determining connection state assistance parameters according to another preferred embodiment of the present invention; specifically, the eNB comprises a first assistive transmitting module 11", a request transmitting module 12", a second assistive obtaining module 13", a second assistive determining module 14", and a scheduling module 18". Specifically, the first assistive transmitting module 11" transmits connection release time information and radio access network assistance information corresponding to a user equipment to a corresponding core network element; the request transmitting module 12" transmits a request for network access service of the user equipment to the core network element; the second assistive obtaining module 13" obtains core network assistance information provided by the core network element, wherein the core network assistance information corresponds to the request for network access service; the second assistive determining module 14" determines connection state assistance parameters corresponding to the user equipment based on the core network assistance information; when the core network assistance information comprises the short inactivity timer information and the longer inactivity timer information corresponding to the user equipment, the scheduling module 18" determines a scheduling strategy corresponding to the user equipment based on the short inactivity timer information in conjunction with the data information transmission state of the eNB and the user equipment.

Herein, the first assistive transmitting module 11", the request transmitting module 12", the second assistive obtaining module 13", and the second assistive determining module 14" of the eNB are identical or substantially identical to corresponding modules shown in FIG. 1, which will not be detailed here, but incorporated here by reference.

When the core network assistance information includes the short inactivity timer information and the longer inactivity timer information corresponding to the user equipment, the scheduling module 18" determines a scheduling strategy corresponding to the user equipment based on the short inactivity timer information in conjunction with the data information transmission state of the eNB and the user equipment.

Specifically, when the longer inactivity timer expires, connection release is performed to the user equipment;

When the eNB makes a user handover decision, if the short inactivity timer does not expire and there is currently not existing data information transmission, handover is performed to the user equipment;

When the eNB makes a user handover decision, if the short inactivity timer expires and there is currently not existing data information transmission, connection release is performed to the user equipment;

When the eNB makes a user handover decision, if there is currently existing data information transmission, handover is performed to the user equipment.

In this way, the time of keeping the user equipment in connected state is optimized, and meanwhile it is not needed to predict the mobility of the user equipment.

Figure 4:
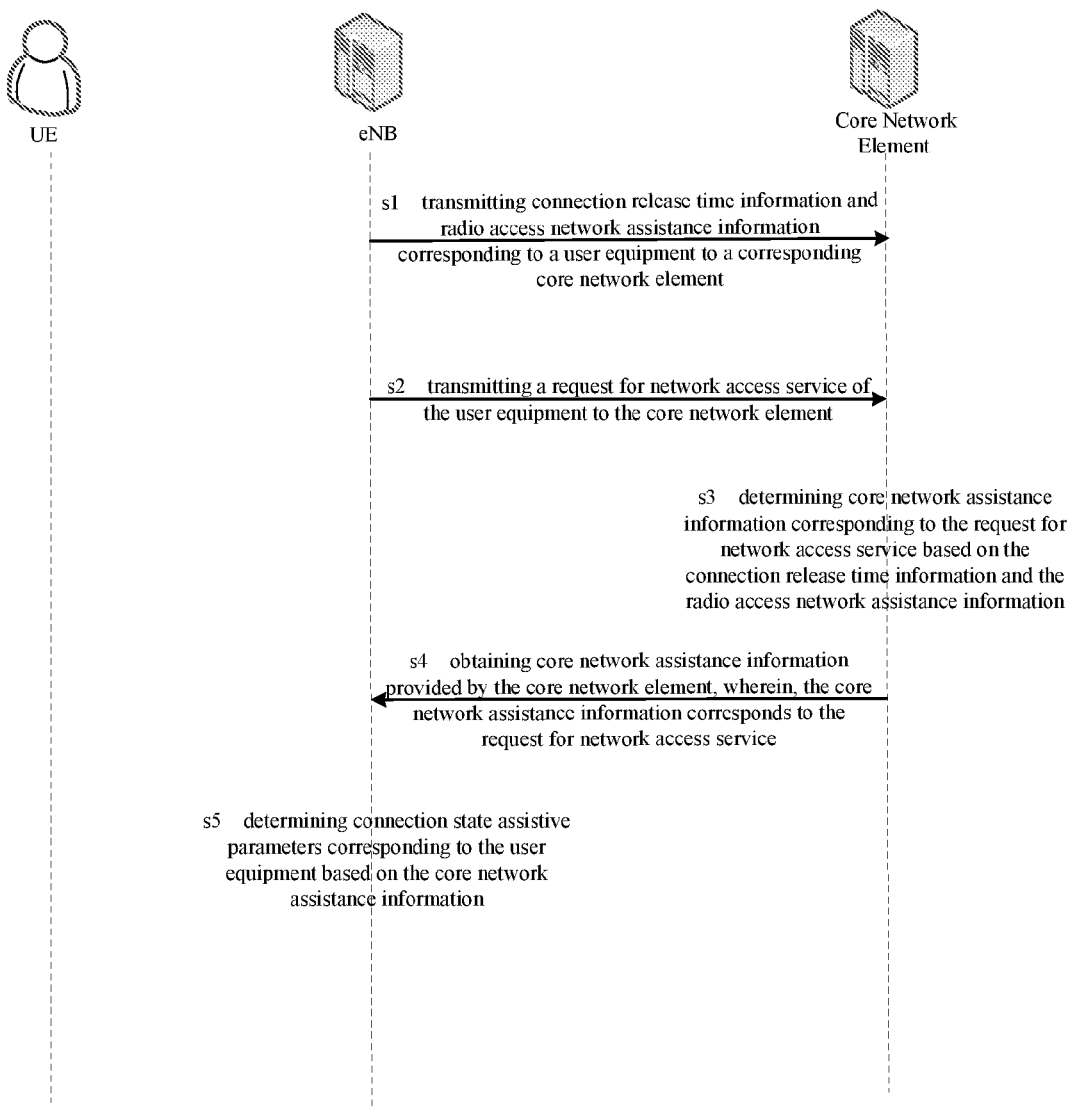
FIG. 4 shows a flow diagram of a method for determining connection state assistive parameters by cooperation of an eNB and a core network element device according to another aspect of the present invention.

FIG. 4 shows a flow diagram of a method for determining connection state assistive parameters by cooperation of an eNB and a core network element device according to another aspect of the present invention. Specifically, in the step s1, the eNB transmits connection release time information and radio access network assistance information corresponding to a user equipment to a corresponding core network element; correspondingly, in the step s1, the core network element obtains the connection release time information and the radio access network assistance information corresponding to the user equipment; in the step s2, the eNB transmits a request for network access service of the user equipment to the core network element; correspondingly, in the step s2, the core network element obtains the request for network access service corresponding to the user equipment; in the step s3, the core network element determines core network assistance information corresponding to the request for network access service based on the connection release time information and the radio access network assistance information; in the step s4, the core network element transmits the core network assistance information to the eNB corresponding to the request for network access service, to act as connection state assistive parameters corresponding to the user equipment; correspondingly, in the step s4, the eNB obtains the core network assistance information provided by the core network element, wherein the core network assistance information corresponds to the request for network access service; in the step s5, the eNB determines connection state assistive parameters corresponding to the user equipment based on the core network assistance information.

Herein, the eNB is in a RAN (Radio Access Network), while the core network element is in a CN (Core Network); here, the core network element comprises one or more MMEs (Mobility Management Entity) or one or more SGSNs (Serving GPRS SUPPORT NODE).

In the step s1, the eNB transmits connection release time information and radio access network assistance information corresponding to a user equipment to a corresponding core network element; correspondingly, in the step s1, the core network element obtains the connection release time information and the radio access network assistance information corresponding to the user equipment.

Specifically, in the step s1, the eNB transmits, in RAN, the connection release time information and radio access network assistance information corresponding to the user equipment, by using, e.g., the S1-AP protocol.

In this embodiment, the connection release time information includes relevant time information of the user equipment during the connection process, e.g., the connection establishment time, the release requesting time, the release completing time, and among others.

The radio access network assistance information (RAN assistance information) comprises at least any one of the following:
  discontinuous reception parameter corresponding to the user equipment;
  short inactivity timer information corresponding to the user equipment;
  long inactivity timer information corresponding to the user equipment.
  statistics of packet inter-arrival time of the user equipment;
  current count of the inactivity timer of the user equipment.

Preferably, the eNB may transmit a RRC connection release request to the user equipment, and transmit a context release request corresponding to the user equipment to the core network element; the core network element transmits a context release command corresponding to the user equipment to the eNB based on the context release request corresponding to the user equipment; the eNB releases the connection to the user equipment based on the context release command, and transmits context release command completion information of the user equipment to the core network element.

In this embodiment, the context release command completion information includes connection release time information and radio access network assistance information corresponding to the user equipment.

Namely, in the eNB, the eNB:
transmits a RRC connection release request to the user equipment and transmits a context release request of the user equipment to a corresponding core network element;
obtains a context release command of the user equipment corresponding to the context release request, wherein, the context release command is transmitted by the core network element;
transmits the context release command completion information of the user equipment corresponding to the context release command of the user equipment to the core network element based on the context release command of the user equipment, wherein the context release command completion information of the user equipment includes the connection release time information and the radio access network assistance information corresponding to the user equipment.

In the core network element, the core network element:
obtains the context release request of the user equipment;
transmits the context release command of the user equipment corresponding to the context release request of the user equipment to the eNB corresponding to the context release request;
obtains the context release command completion information of the user equipment corresponding to the context release command of the user equipment, wherein the context release command completion information of the user equipment is provided by the eNB and includes the connection release time information and the radio access network assistance information corresponding to the user equipment.

Namely, when the user equipment releases the connection with the eNB, the eNB will transmit the connection release time information and radio access network assistance information corresponding to the user equipment to the core network element.

More preferably, the eNB may transmit a RRC connection release request to the user equipment based on a predetermined release condition, wherein the predetermined release condition includes any least any one of the following:
the longer inactivity timer corresponding to the user equipment expires;
performing correction release to the user equipment in the case that the short inactivity timer corresponding to the user equipment expires and there is no data information forwarded currently.

In the step s2, the eNB transmits a request for network access service of the user equipment to the core network element; correspondingly, in the step s2, the core network element obtains the request for network access service corresponding to the user equipment.

Specifically, in the step s2, the eNB obtains a request for network access service of the user equipment, wherein the request for network access service may be transmitted by the user equipment to the eNB; for example, when the user equipment obtains new small data for transmission, the user equipment transmits the request for network access service to the eNB; then, the eNB transmits the request for network access service of the user equipment to the core network element using a NAS protocol.

Correspondingly, in the step s2, the core network element obtains the request for network access service corresponding to the user equipment through interaction with the eNB using the NAS protocol.

Here, the user equipment and the user equipment corresponding to the connection release time information and radio access network assistance information in the step s1 are the same equipment; the core network element records, in the step s1, user equipment ID information of the user equipment corresponding to the connection release time information and radio access network assistance information. When the core network element obtains the request for network access service of the user equipment, the core network element authenticates the user equipment ID information of the user equipment corresponding to the request for network access service. If the core network element includes the connection release time information and the radio access network assistive information corresponding to the user equipment ID information, the step s3 is performed in continuation.

Those skilled in the art should understand, here, the user equipment may transmit the request for network access service via one or more eNBs; namely, the user equipment may transmit the connection release time information and the radio access network assistive information corresponding to the user equipment to the corresponding core network element via the first eNB, and then the user equipment transmits the request for network access service of the user equipment to the core network element via the first eNB or the second eNB.

In the step s3, the core network element determines core network assistive information corresponding to the request for network access service based on the connection release time information and the radio access network assistive information.

Specifically, in the step s3, the core network element determines the core network assistance information based on the connection release time information and the radio access network assistance information through a plurality of time parameters in the connection release time information and various kinds of parameters in the radio access network assistance information; wherein the core network assistance information corresponds to the request for network service; since the request for network service includes the user equipment ID of the user equipment, the core network assistance information also corresponds to the user equipment.

Herein, the core network assistance information includes at least any one of the following:
discontinuous reception parameter (DRX parameter) corresponding to the user equipment;
short inactivity timer information corresponding to the user equipment;
longer inactivity timer information corresponding to the user equipment.

Preferably, the core network assistance information further includes:
packet inter-arrival time information corresponding to the user equipment.

Here, the above parameters are explained as follows:

1. Discontinuous reception parameter corresponding to the user equipment: the discontinuous reception parameter includes: DRX cycle and onDuration Timer.

In the connected mode, the DRXcycle of the user equipment is used for monitoring PDCCH discontinuously. The longer the value of the DRX cycle is, the more power consumption is saved, but the greater is the probability of missing information; the shorter is the value of the DRX cycle, the smaller is the probability of missing information, and meanwhile the lower is the efficiency. For different applications, due to different traffic models/features, the values of the DRX cycle are also different. Configuring a proper value for a SDDTE UE shall be carefully for the eNB.

In the MAC layer, the onDuration Timer specifies a number of consecutive PDCCH-subframe(s) at the beginning of the DRX cycle. Similar with the DRX cycle itself, the eNB can also configure an proper value for the SDDTE UE.

2. Short inactivity timer information and longer inactivity timer information corresponding to the user equipment:

Because signaling to initialize a new RRC connection establishment is not that much larger than the signaling in a handover procedure, if there is more than one handover procedure before the inactivity timer expires, the more the signaling overhead would be.

Therefore, there are provided two inactivity timers, i.e., a short inactivity timer and a longer inactivity timer, both of which are proposed as the assistance information for assisting eNB in efficient decision making to keep UE in connected or idle mode. If the short inactivity timer expires the user equipment will be handed over to the idle mode at once eNB decides the UE to perform handover ahead of the Longer Inactivity Timer expiring.

When the handover will happen immediately and there is no data to be handed over, to keep the UE in connected mode is not valuable for the purpose of signaling saving. This scheme optimize the time of keeping UE in connected mode which does not require a prediction about the UE mobility.

3. Packet inter-arrival time information corresponding to the user equipment:

In the RAN, it could not conclude on a more precise maximum value for the packet inter-arrival time/UE inactivity cycle for which keeping UEs in connected mode is considered. Because at idle mode, any historical information about mobility would be unavailable at a new data access whether the UE is no mobility or in a new eNB, it may takes some time in eNB to find a more precise maximum value for the packet inter-arrival time/UE inactivity period.

The packet arrival distribution will impact the efficiency of the long connected mode. For example, to keeping the long connected is the most efficiency in the case of the high density packet arrival. But in other case, the low-density packet arrival will cause the long connection rather inefficiency. Furthermore, there may be a negative effect on radio resource usage e.g. PUCCH resources if many UEs are kept in connected mode but only active infrequently.

Therefore, by appointing each UE to keep in a connected state or an idle state, it is advantageous to reduce signaling load for frequency (small) data transmission. The data arrival time information can be defined and collected by the eNBs at the last connection time, and in the next connection, the core network element will forward the packet arrival time information to a new eNB. Therefore, the new eNB can take experiential decision for how long time to keep the UE in connected mode.

Preferably, in the step s3, the core network element may obtain activity dynamic monitoring information of the user equipment and determine the core network assistance information corresponding to the user equipment based on the connection release time information and the radio access network assistance information in conjunction with the activity dynamic monitoring information.

Specifically, in the step s3, the core network element interacts with the eNB to obtain or obtain in real-time the activity dynamic monitoring information of the user equipment, e.g., connection information, handover information, mobility information, state information, and the like, and determines the core network assistance information corresponding to the user equipment based on the connection release time information and radio access network assistance information in conjunction with the activity dynamic monitoring information.

In the step s4, the core network element transmits the core network assistive information to the eNB corresponding to the request for network access service, to act as the connection state assistance parameters corresponding to the user equipment; correspondingly, in the step s4, the eNB obtains the core network assistance information provided by the core network element, which core network assistance information corresponds to the request for network access service.

Specifically, in the step s4, the core network element directly transmits the core network assistive information to the eNB corresponding to the request for network access service, or transmits the core network assistance information in conjunction with information of an S1-AP initial context establishing request, to the eNB corresponding to the request for network access service, to act as the connection state assistance parameters corresponding to the user equipment.

Correspondingly, in the step s4, the eNB obtains the core network assistance information provided by the core network element, wherein, the core network assistance information corresponds to the request for network access service.

In the step s5, the eNB determines connection state assistance parameters corresponding to the user equipment based on the core network assistance information.

Specifically, in the step s5, the eNB takes the core network assistance information as the connection state assistance parameters corresponding to the user equipment based on the core network assistance information, such that when the user equipment and the eNB are in a connected state, the eNB controls the connection state of the user equipment using the connection state assistance parameters corresponding to the user equipment.

Figure 5:
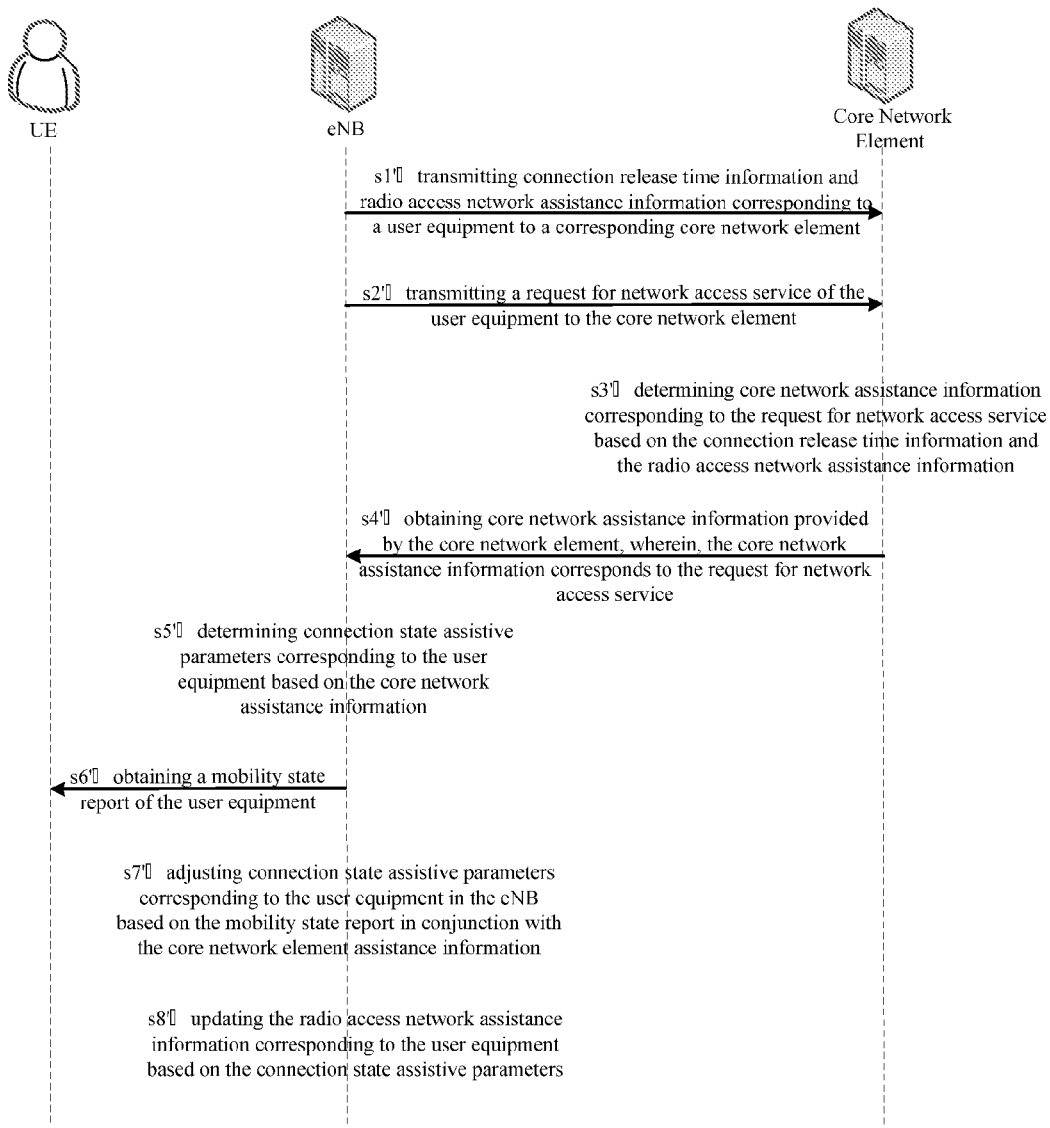
FIG. 5 shows a flow diagram of a method for determining connection state assistive parameters by cooperation of an eNB and a core network element device according to one preferred embodiment of the present invention.

FIG. 5 shows a flow diagram of a method for determining connection state assistive parameters by cooperation of an eNB and a core network element device according to one preferred embodiment of the present invention. Specifically, in the step s1', the eNB transmits connection release time information and radio access network assistance information corresponding to the user equipment to a corresponding core network element; correspondingly, in the step s1', the core network element obtains the connection release time information and the radio access network assistance information corresponding to the user equipment; in the step s2', the eNB transmits a request for network access service of the user equipment to the core network element; correspondingly, in the step s2', the core network element obtains a request for network access service corresponding to the user equipment; in the step s3', the core network element determines core network assistance information corresponding to the request for network access service based on the connection release time information and the radio access network assistance information; in the step s4', the core network element transmits the core network assistance information to an eNB corresponding to the request for network access service, to act as connection state assistive parameters corresponding to the user equipment; correspondingly, in the step s4', the eNB obtains the core network assistance information provided by the core network element, wherein, the core network assistance information corresponds to the request for network access service; in the step s5', the eNB determines connection state assistance parameters corresponding to the user equipment based on the core network assistance information; in the step s6', the eNB obtains a mobility state report of the user equipment; in the step s7', the eNB adjusts the connection state assistance parameters corresponding to the user equipment in the eNB based on the mobility state report in conjunction with the core network element assistance information; in the step s8', the eNB updates the radio access network assistance information corresponding to the user equipment based on the connection state assistance parameter.

Herein, step s1', the step s2', the step s3', the step s4' and the step s5' are identical or substantially identical to corresponding steps shown in FIG. 4, which will not be detailed here, but incorporated here by reference.

In the step s6', the eNB obtains the mobility state report of the user equipment.

Specifically, in the step s6', the eNB, through interaction with the user equipment, obtains the mobility state report of the user equipment; wherein the mobility state report includes, e.g., mobility state, handover times, transitions of cells, idle time and other information of the user equipment in idle/connection state.

Here, preferably, the eNB obtains the mobility state report of the user equipment only when the user equipment establishes a connection with the eNB; in this instance, the mobility state report includes, for example, mobility state, handover times, transitions of cells, idle time, and other information of the user equipment in idle state.

The reason is that the optimum trade-off between state transition and handover signaling depends on the cell sizes and UE movement. Therefore, for the decision about keeping UE in connected mode for a longer time would require a prediction about the UE mobility in order to be able to assess how much handover signaling can be expected.

According to Hetnet mobility WI, the user equipment should provide mobility information to the network at RRC connection setup. Therefore, it is not required to store the mobility state of the user from the latest connection; instead, the mobility state report of the user equipment is obtained when the user equipment performs establishment of RRC connection.

In the step s7', the eNB adjusts connection state assistance parameters corresponding to the user equipment in the eNB based on the mobility state report in conjunction with the core network element assistance information, e.g., adjusting the inactivity timer information and/or DRX parameter of the user, and the like.

In the step s8', the eNB updates the radio access network assistance information corresponding to the user equipment based on the connection state assistance parameters.

Here, the update may be an instant update; besides, because the eNB needs to transmit the radio access network assistance information to the core network element for storage when the user equipment and the eNB perform connection release, the radio access network assistance information corresponding to the user equipment may also be updated further based on the connection state assistance parameters when the user equipment and the eNB perform connection release, and meanwhile the updated radio access network assistance information is transmitted to the core network element.

Figure 6:
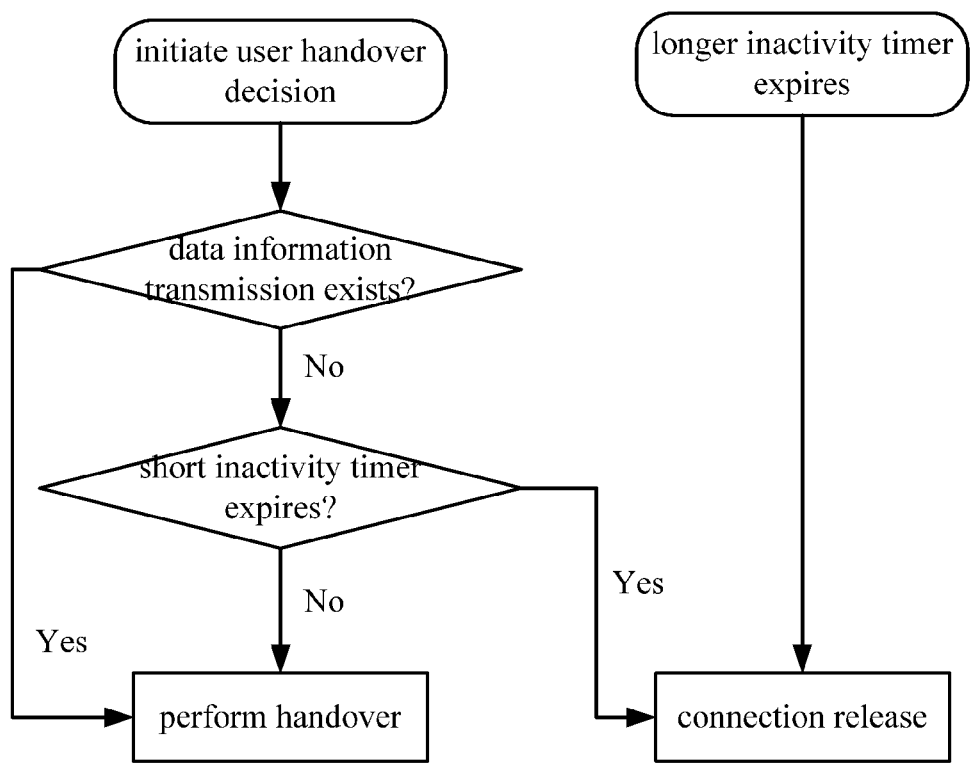
FIG. 6 shows a flow diagram of a method for determining a scheduling strategy corresponding to the user equipment according to according to one preferred embodiment of the present invention.

FIG. 6 shows a flow diagram of a method for determining a scheduling strategy corresponding to the user equipment according to according to one preferred embodiment of the present invention. Specifically, when the core network assistance information comprises the short inactivity timer information and the longer inactivity timer information corresponding to the user equipment, the eNB determines a scheduling strategy corresponding to the user equipment based on the short inactivity timer information in conjunction with the data information transmission state of the eNB and the user equipment.

When the core network assistance information includes the short inactivity timer information and the longer inactivity timer information corresponding to the user equipment, the eNB determines a scheduling strategy corresponding to the user equipment based on the short inactivity timer information in conjunction with the data information transmission state of the eNB and the user equipment.

Specifically, when the longer inactivity timer expires, connection release is performed to the user equipment;

When the eNB makes a user handover decision, if the short inactivity timer does not expire and there is currently not existing data information transmission, handover is performed to the user equipment;

When the eNB makes a user handover decision, if the short inactivity timer expires and there is currently not existing data information transmission, connection release is performed to the user equipment;

When the eNB makes a user handover decision, if there is currently existing data information transmission, handover is performed to the user equipment.

In this way, the time of keeping the user equipment in connected state is optimized, and meanwhile it is not needed to predict the mobility of the user equipment.

To those skilled in the art, apparently the present invention is not limited to the details of the aforementioned exemplary embodiments; moreover, under the premise of not deviating from the spirit or fundamental characteristics of the invention, this invention can be accomplished in other specific forms. Therefore, the embodiments should be considered exemplary and non-restrictive no matter from which point, the scope of the invention is defined by the appended claims instead of the above description, and aims at covering the meanings of the equivalent components falling into the claims and all changes within the scope in this invention. Any reference sign in the claims shall not be deemed as limiting the concerned claims. Besides, apparently the word "comprise/include" does not exclude other components or steps, singular numbers does not exclude complex numbers, the plurality of components or means mentioned in device claims may also be accomplished by one component or means through software or hardware, the wording like first and second are only used to represent names rather than any specific order.

We claim:

1. A method for determining connection state assistive parameters in an eNB, wherein the method comprises:

transmitting connection release time information and radio access network assistance information corresponding to a user equipment to a corresponding core network element;

wherein, the method further comprises:
transmitting a request for network access service of the user equipment to the core network element;
obtaining core network assistance information provided by the core network element, wherein, the core network assistance information corresponds to the request for network access service;
determining connection state assistive parameters corresponding to the user equipment based on the core network assistance information;
wherein the core network assistance information includes at least any one of the following:
discontinuous reception parameter corresponding to the user equipment;
short inactivity timer information corresponding to the user equipment;
long inactivity timer information corresponding to the user equipment.

2. The method according to claim 1, wherein the method further comprises:
obtaining a mobility state report of the user equipment;
adjusting connection state assistive parameters corresponding to the user equipment in the eNB based on the mobility state report in conjunction with the core network element assistance information;
updating the radio access network assistance information corresponding to the user equipment based on the connection state assistive parameters.

3. The method according to claim 1, wherein when the core network assistance information comprises the short inactivity timer information and the long inactivity timer information corresponding to the user equipment, the method further comprises:
determining a scheduling strategy corresponding to the user equipment based on the short inactivity timer information in conjunction with data information transmission state of the eNB and the user equipment;
wherein the scheduling strategy comprises any one of the following:
performing handover for the user equipment if the short inactivity timer does not expire and data information transmission is not existing when the eNB makes a user handover decision;
performing connection release for the user equipment if the long inactivity timer expires and data information transmission is not existing when the eNB makes a user handover decision;
performing connection release for the user equipment when the long inactivity timer expires.

4. A method for determining connection state assistive parameters subsidiarily in a core network element, wherein the method comprises:
obtaining connection release time information and radio access network assistance information corresponding to the user equipment;
wherein the method further comprises:
obtaining a request for network access service corresponding to the user equipment;
determining core network assistance information corresponding to the request for network access service based on the connection release time information and the radio access network assistance information;
transmitting the core network assistance information to an eNB corresponding to the request for network access service, to act as connection state assistive parameters corresponding to the user equipment;
wherein the core network assistance information includes at least any one of the following:
discontinuous reception parameter corresponding to the user equipment;
short inactivity timer information corresponding to the user equipment;
long inactivity timer information corresponding to the user equipment.

5. The method according to claim 4, wherein the determining comprises:
obtaining activity dynamic monitoring information of the user equipment;
determining core network assistance information corresponding to the user equipment based on the connection release time information and radio access network assistance information in conjunction with the activity dynamic monitoring information.

6. An eNB for determining connection state assistive parameters, wherein the eNB comprises:
a first assistive transmitting module configured to transmit connection release time information and radio access network assistance information corresponding to a user equipment to a corresponding core network element;
wherein the eNB further comprises:
a request transmitting module configured to transmit a request for network access service of the user equipment to the core network element;
a second assistive obtaining module configured to obtain core network assistance information provided by the core network element, wherein, the core network assistance information corresponds to the request for network access service;
a second assistive determining module configured to determine connection state assistive parameters corresponding to the user equipment based on the core network assistance information;
wherein the core network assistance information includes at least any one of the following:
discontinuous reception parameter corresponding to the user equipment;
short inactivity timer information corresponding to the user equipment;
long inactivity timer information corresponding to the user equipment.

7. The eNB according to claim 6, wherein the eNB further comprises:
a report obtaining module configured to obtain a mobility state report of the user equipment;
an adjusting module configured to adjust connection state assistive parameters corresponding to the user equipment in the eNB based on the mobility state report in conjunction with the core network element assistance information;
an updating module configured to update the radio access network assistance information corresponding to the user equipment based on the connection state assistive parameters.

8. The eNB according to claim 6, wherein when the core network assistance information comprises the short inactivity timer information and the long inactivity timer information corresponding to the user equipment, the eNB further comprises:
a scheduling module configured to determine a scheduling strategy corresponding to the user equipment based on the short inactivity timer information in conjunction with data information transmission state of the eNB and the user equipment;

wherein the scheduling strategy comprises any one of the following:
performing handover for the user equipment if the short inactivity timer does not expire and data information transmission is not existing when the eNB makes a user handover decision;
performing connection release for the user equipment if the long inactivity timer expires and data information transmission is not existing when the eNB makes a user handover decision;
performing connection release for the user equipment when the long inactivity timer expires.

9. A system for determining connection state assistive parameters, comprising the eNB according to claim 6, and a core network element comprising a first assistive obtaining module configured to obtain connection release time information and radio access network assistance information corresponding to the user equipment, wherein the device further comprises a request obtaining module configured to obtain a request for network access service corresponding to the user equipment, a second assistive determining module configured to determine core network assistance information corresponding to the request for network access service based on the connection release time information and the radio access network assistance information, and a second assistive transmitting module configured to transmit the core network assistance information to an eNB corresponding to the request for network access service, to act as connection state assistive parameters corresponding to the user equipment, wherein the core network assistance information includes at least any one of the following:
discontinuous reception parameter corresponding to the user equipment;
short inactivity timer information corresponding to the user equipment;
long inactivity timer information corresponding to the user equipment.

10. A core network element for determining connection state assistive parameters subsidiarily, wherein the device comprises:
a first assistive obtaining module configured to obtain connection release time information and radio access network assistance information corresponding to the user equipment;
wherein the device further comprises:
a request obtaining module configured to obtain a request for network access service corresponding to the user equipment;
a second assistive determining module configured to determine core network assistance information corresponding to the request for network access service based on the connection release time information and the radio access network assistance information;
a second assistive transmitting module configured to transmit the core network assistance information to an eNB corresponding to the request for network access service, to act as connection state assistive parameters corresponding to the user equipment;
wherein the core network assistance information includes at least any one of the following:
discontinuous reception parameter corresponding to the user equipment;
short inactivity timer information corresponding to the user equipment;
long inactivity timer information corresponding to the user equipment.

11. The core network element according to claim 10, wherein the second assistive determining module is configured to:
obtain activity dynamic monitoring information of the user equipment;
determine core network assistance information corresponding to the user equipment based on the connection release time information and radio access network assistance information in conjunction with the activity dynamic monitoring information.

12. The core network element according to claim 10, wherein the core network element comprises MME or SGSN.

* * * * *